(12) United States Patent
Hikmet

(10) Patent No.: US 8,820,967 B2
(45) Date of Patent: Sep. 2, 2014

(54) LIGHTING APPARATUS

(75) Inventor: Rifat Ata Mustafa Hikmet, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/521,231

(22) PCT Filed: Feb. 8, 2011

(86) PCT No.: PCT/IB2011/050520
§ 371 (c)(1),
(2), (4) Date: Jul. 10, 2012

(87) PCT Pub. No.: WO2011/098948
PCT Pub. Date: Aug. 18, 2011

(65) Prior Publication Data
US 2013/0128583 A1    May 23, 2013

(30) Foreign Application Priority Data
Feb. 10, 2010 (EP) ................................. 10153171

(51) Int. Cl.
*G02B 27/20* (2006.01)
(52) U.S. Cl.
USPC ..................... 362/259; 362/296.01; 362/327
(58) Field of Classification Search
USPC ........ 362/259; 345/32; 369/100, 103, 112.01, 369/112.03, 112.05, 112.06, 112.1
See application file for complete search history.

(56) References Cited

U.S. PATENT DOCUMENTS

| 5,471,327 | A | * | 11/1995 | Tedesco et al. ................. 359/15 |
| 2004/0004586 | A1 | | 1/2004 | Endo et al. |
| 2004/0190427 | A1 | | 9/2004 | Ide et al. |
| 2007/0109784 | A1 | | 5/2007 | Kosnik et al. |
| 2008/0239905 | A1 | | 10/2008 | Yamamoto et al. |
| 2010/0103676 | A1* | | 4/2010 | Noeth ........................... 362/276 |

FOREIGN PATENT DOCUMENTS

EP        0441040 A2    8/1991
JP    2000187434 A  *  7/2000  ............... G03H 1/22

* cited by examiner

*Primary Examiner* — Donald Raleigh
(74) *Attorney, Agent, or Firm* — Yuliya Mathis

(57) ABSTRACT

The invention relates to a lighting apparatus comprising a laser (102) for emitting a first laser beam (103) and a diffractive reflective element (104). The first laser beam (103) is reflected by the diffractive reflective element (104) for generating a second laser beam (105) being the reflected first laser beam, wherein the diffractive reflective element (104) is adapted such that the effective surface area of the second laser beam (105) is larger than the effective surface area of the first laser beam (103). The second laser beam is supposed to be pointed directly or indirectly to the eyes of a person. Since the diffractive reflective element increases the effective surface area and is used in a reflective mode, i.e. the first laser beam will generally not directly meet the eye of the person, if the diffractive reflective element is damaged or displaced, the risk of eye damages can be reduced.

8 Claims, 2 Drawing Sheets

LIGHTING APPARATUS

FIELD OF THE INVENTION

The invention relates to a lighting apparatus and a lighting method.

BACKGROUND OF THE INVENTION

US 2007/0109784 A1 discloses a lighting apparatus comprising a laser emitting a laser beam being expanded by a negative lens and collimated by a positive lens. The expanded collimated light beam is directed onto a transmissive holographic diffuser to produce a diffused light beam. The diffused light beam has an expanded cross section and provides an extended glare source at increased power downrange. The extended source produced by the holographic diffuser creates an extended image on the retina of the human eye. The extended retinal image permits a higher power laser exposure, compared to a point source image common in conventional designs.

This lighting apparatus has the drawback that, if the holographic diffuser of the lighting apparatus is damaged, the dimensions of the image on the retina can be varied, in particular, reduced. This could lead to an increased intensity on the retina and, thus, to an increased risk of damaging the retina.

SUMMARY OF THE INVENTION

It is an object of the present invention to provide a lighting apparatus and a lighting method comprising a laser, wherein the risk of damaging the retina by laser light can be decreased.

In a first aspect of the present invention a lighting apparatus is presented, which comprises a laser for emitting a first laser beam and a diffractive reflective element, wherein the first laser beam and the diffractive reflective element are arranged such that the first laser beam is reflected by the diffractive reflective element for generating a second laser beam being the reflected first laser beam, and wherein the diffractive reflective element is adapted such that the effective surface area of the second laser beam is larger than the effective surface area of the first laser beam.

The effective surface area of the second laser beam is larger than the effective surface area of the first laser beam, if the minimal focus area to which the second laser beam can be focused by using a lens is larger than the minimal focus area to which the first laser beam could be focused by using the same lens.

Since the diffractive reflective element is adapted such that the effective surface area of the second laser beam is larger than the effective surface area of the first laser beam, the second laser beam can only be focused to a focus area on the retina being larger than a minimal focus area on the retina, to which the first laser beam can be focused. This reduces the maximally obtainable intensity of the laser beam on the retina and, thus, the risk of damaging the retina. Moreover, the second laser beam is supposed to be pointed directly or indirectly to the eye of a person. If the diffractive reflective element is damaged or displaced such that the first laser beam does not or does not properly meet the diffractive reflective element, in particular, if the first laser beam does not meet the diffractive reflective element at all, the first laser beam will not point to the eye of the person and be focused on the retina of the person, because the lighting apparatus works in a reflective mode, i.e. the second laser beam is the reflected first laser beam and not a transmitted first laser beam. This further decreases the risk of damaging the retina of a person.

The second laser beam is still a laser beam having laser characteristics. For example, the second laser beam can be collimated to a parallel laser beam with high efficiency using an optical element like a lens, and the second laser beam is still coherent.

The diffractive reflective element is preferentially a holographic reflective element. The holographic reflective element can be a computer generated hologram, which can be generated by calculating a hologram based on a desired illumination pattern, recording sub-micron features corresponding to the calculated hologram in a layer of a photosensitive material like a photosensitive polymer by using a laser, and by locating a reflective layer on the sub-micron features, for example, an aluminum layer, preferentially by evaporation. The holographic reflective element can also be generated without calculating a hologram. A surface relief can be fabricated using holographic exposure techniques involving laser recording of sub-micron features in a photosensitive material like a photosensitive polymer. Such a photosensitive material with the recorded sub-micron features can easily be replicated for mass production. Subsequently, a reflective layer is placed on the sub-micron features, for example, by evaporation. The reflective layer is preferentially an aluminum layer, but can also be another reflective layer, in particular, another metal layer. The photosensitive material is preferentially a photosensitive layer or photosensitive film.

The holographic reflective element can also be a volume hologram. A volume hologram can be generated by recording a holographic diffuser in the form of refractive index variations within a photosensitive volume material like a photorefractive material. These volume holograms can be adapted to be reflective, if a reflective layer is not present. However, also the volume holograms can be provided with a reflective layer which ensures that the first laser beam will not traverse the volume hologram.

The holographic reflective element is preferentially adapted to produce an image, a word, et cetera.

The diffractive reflective element, in particular, the holographic reflective element, is preferentially adapted such that the second laser beam is diffracted into larger angles in comparison to the first laser beam, wherein the second laser beam being diffracted into larger angles can be made parallel by using a lens.

It is further preferred that the diffractive reflective element is adapted to increase the effective surface area of the second laser beam such that the second laser beam is eye safe. Preferentially, a maximal intensity on the retina related to eye safety is defined such that any intensity below the defined maximal intensity on the retina will not damage the retina. The lighting apparatus is preferentially adapted such that the maximally obtainable intensity on the retina of a healthy eye defined by the maximal power of the second laser beam and the minimal focus area is below the defined maximal intensity related to eye safety. The defined maximal intensity on the retina related to eye safety is preferentially $10^3$ Wcm$^{-2}$ or smaller and further preferred $10^2$ Wcm$^{-2}$ or smaller. If the reflection of the first laser beam at the diffractive reflective element causes several second laser beams, the lighting apparatus is preferentially adapted such that the maximal obtainable intensity of each of the several second laser beams on the retina of a healthy eye is below the defined maximal intensity related to eye safety. This ensures that the retina of a person will not be damaged, if the second laser beam is directed to the eyes of the person. The intensity at an area on the retina, on which one of the several second laser beams has been focused, can be regarded as a local intensity.

It is further preferred that the lighting apparatus is adapted to expand the first laser beam before meeting the diffractive reflective element. The lighting apparatus comprises, for example, an expansion unit comprising at least one lens for expanding the first laser beam. The expansion unit can comprise two lenses for transforming a parallel first laser beam in an expanded parallel first laser beam, or a lens can be used for increasing the degree of divergence of the first laser beam for expanding the same, or a natural degree of divergence can be used for expanding the first laser beam. The expansion of the first laser beam further increases eye safety. In particular, it could be possible that the second laser beam, i.e. the first laser beam which has been reflected by the diffractive reflective element, is not eye safe, if the first laser beam is not expanded. This means that the intensity, in particular, the local intensity, on the retina of a healthy eye could be larger than the above mentioned defined maximal intensity related to eye safety, if the first laser beam would not be expanded. In this case, the first laser beam is preferentially expanded such that the cross section of the first laser beam on the diffractive reflective element is increased, in order to increase the size of, for example, an image on the retina and thereby increasing the minimally focusable area of the one or several second laser beams on the retina. This decreases the maximally obtainable intensity on the retina, wherein the first laser beam is preferentially adapted to decrease the maximally obtainable intensity of the retina below the defined maximal intensity related to eye safety.

It is preferred that the angle corresponding to the full width at half maximum of the intensity of the second laser beam is smaller than 60 degrees, further preferred smaller than 40 degrees and even further preferred smaller than 10 degrees. The intensity of a light beam generally depends on an azimuth defined by an angle θ with respect to an axis along which the intensity has its maximum, wherein the angle θ can range from −90 degree to +90 degree. Angles $+\theta_1$ and $-\theta_2$ can be defined as the angles at which the intensity is equal to the half of the maximum intensity. The angle corresponding to the full width at half maximum of the intensity is then preferentially defined as $\theta_1+\theta_2$. A second laser beam having an angle corresponding to the full width at half maximum of the intensity of the second laser beam in the above mentioned ranges can easily be collimated for generating a parallel second laser beam by using a simple optical component such as a lens.

It is further preferred that the diffractive reflective element is adapted such that a light pattern is produced by the second laser beam. The light pattern is, for example, an image of an object. In particular, the lighting apparatus preferentially comprises a light pattern producing unit for producing a light pattern, wherein the laser, the diffractive reflective element and the light pattern producing unit are arranged such that at least one of the first laser beam and the second laser beam meets the light pattern producing unit for producing the light pattern. Also the light pattern producing unit is preferentially adapted such that the second laser beam is eye safe. The light pattern producing unit can be adapted to produce a static light pattern or a dynamic light pattern. A dynamic light pattern is a non-static, moving light pattern.

The light pattern producing unit comprises preferentially at least one of the following elements: a passive diffractive optical element, a passive reflective optical element, a spatial light modulator based on liquid crystals, a micro-mechanical element. The spatial light modulator based on liquid crystals and/or the micro-mechanical element can be used for producing dynamic light patterns.

The lighting apparatus can therefore be adapted to generate static or dynamic light patterns, wherein the risk of damaging the retina is reduced, in particular, wherein the lighting apparatus is eye safe. The static or dynamic light patterns can, for example, be used in consumer applications, wherein, for example, an object like a wall of a room, an object in a shop window et cetera is decoratively illuminated.

In a further aspect of the present invention a lighting method is presented, which comprises emitting a first laser beam by a laser and reflecting the first laser beam by a diffractive reflective element for generating a second laser beam being the reflected first laser beam, wherein the diffractive reflective element is adapted such that the effective surface area of the second laser beam is larger than the effective surface area of the first laser beam.

It shall be understood that the lighting apparatus and the lighting method described herein have similar preferred embodiments.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
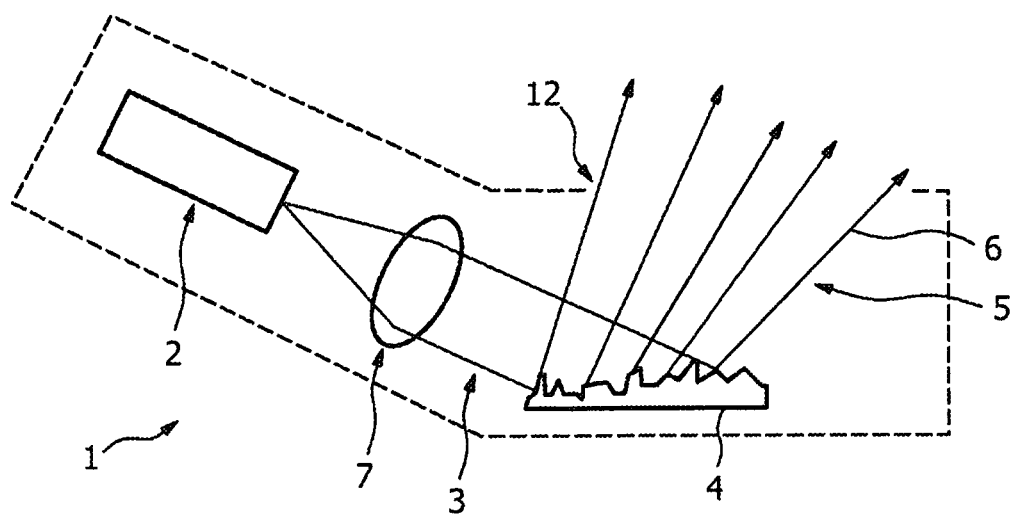
FIG. 1 shows schematically and exemplarily a first embodiment of a lighting apparatus.

FIG. 1 shows schematically and exemplarily an embodiment of a lighting apparatus 1 comprising a laser 2 for emitting a first laser beam 3. The lighting apparatus 1 further comprises a diffractive reflective element 4 being, in this embodiment, a holographic reflective element. The first laser beam 3 is collimated by a lens 7 for parallelizing the first laser beam 3, wherein by using the divergence of the first laser beam 3 the first laser beam 3 is expanded before being collimated by the lens 7. The first laser beam 3 and the holographic reflective element 4 are arranged such that the first laser beam 3 is reflected by the holographic reflective element 4 for generating a second laser beam 5. The second laser beam 5 comprises several reflected rays 6 which point at least partly in different directions. The holographic reflective element 4 is adapted such that the effective surface area of the second laser beam 5 is larger than the effective surface area of the first laser beam 3.

The second laser beam 5 is still a laser beam having laser characteristics. For example, the second laser beam 5 can be collimated to a parallel laser beam with high efficiency using an optical element like a lens and is still coherent.

The second laser beam 5 can be directed directly to the eyes of a person or can be directed, in particular, projected by using a lens, to an object like a wall or an object in a shop window. The second laser beam 5 can, for example, be directed to objects which should be decoratively illuminated.

The laser beam before meeting the diffractive reflective element is denoted as first laser beam and the laser beam after having met the diffractive reflective element is denoted as second laser beam.

The different elements of the lighting apparatus, in particular, the laser 2, the lens 7, the holographic reflective element 4 and possible further elements are preferentially arranged on a support, in particular, arranged within a casing having a window for allowing the second laser beam 5 to leave the casing. Such an optional casing with a window 12 is schematically and exemplarily indicated in FIG. 1 by the dashed line 11.

The holographic reflective element 4 is adapted such that the second laser beam 5 is diffracted into larger angles in comparison to the first laser beam 3, wherein the second laser beam 5 being diffracted into larger angles can be made parallel by using a lens. In the embodiment shown in FIG. 1, the first laser beam 3 is well collimated when meeting the holographic reflective element 4. The second laser beam 5 is less collimated and the rays 6 of the second laser beam 5 cover a larger angular range than rays of the collimated first laser beam 3, i.e. the second laser beam is diffracted into larger angles than the first laser beam.

The holographic reflective element 4 is adapted such that the second laser beam 5 is focusable by a lens, in particular, by a lens of a healthy eye, to a minimal focus area being larger than the minimal focus area of the first laser beam 3 to which the first laser beam could be focused by using the same lens. The holographic reflective element 4 is adapted to increase the effective surface area of the second laser beam 5 such that the second laser beam 5 is eye safe, and the laser 2 and the holographic reflective element 4 are adapted such that the second laser beam 5 has an angle corresponding to the full width at half maximum of the intensity being smaller than 60 degrees, further preferred smaller than 40 degrees and even further preferred smaller than 10 degrees.

Figure 2:
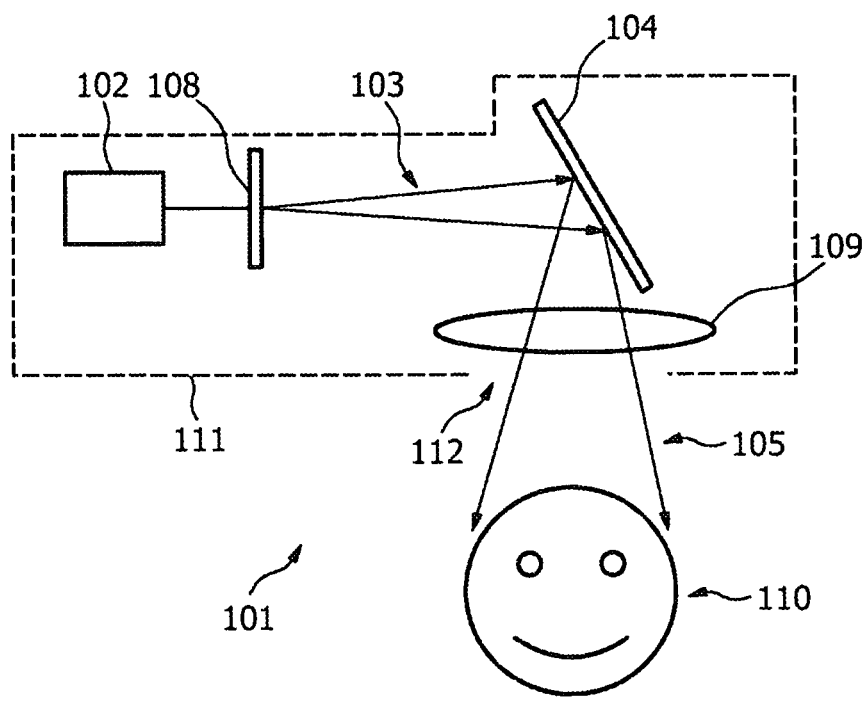
FIG. 2 shows schematically and exemplarily a second embodiment of a lighting apparatus.

FIG. 2 shows schematically and exemplarily a further embodiment of a lighting apparatus 101 comprising a laser 102 and a holographic reflective element 104. The laser 102 emits a first laser beam 103 which is directed to and reflected by the holographic reflective element 104. The reflected first laser beam forms a second laser beam 105, which is projected by a lens 109 onto an object like a wall, an object in a shop window, et cetera. The holographic reflective element 104 is adapted such that the effective surface area of the second laser beam 105 is larger than the effective surface area of the first laser beam 103. Also the second laser beam 105 still has laser characteristics. For example, also the second laser beam 105 can be collimated to a parallel laser beam with high efficiency using an optical element like a lens, is still coherent, and has an angle corresponding to the full width at half maximum of the intensity being preferentially smaller than 60 degrees. Also the holographic reflective element 104 is adapted such that the second laser beam 105 is focusable by a lens, in particular, by a lens of a healthy eye, to a minimal focus area being larger than the minimal focus area of the first laser beam 103 to which the first laser beam could be focused by using the same lens. In particular, also the holographic reflective element 104 is adapted to increase the effective surface area of the second laser beam 105 such that the second laser beam 105 is eye safe.

The lighting apparatus 101 further comprises a light pattern producing unit 108 for producing a light pattern 110, wherein the laser 102, the diffractive reflective element 104 and the light pattern producing unit 108 are arranged such that the first laser beam 103 is influenced by the light pattern producing unit 108 before meeting the holographic reflective element 104 for producing the light pattern 110. In addition or alternatively, a light pattern producing unit can also be arranged in the second laser beam 105 for producing the light pattern. The light pattern producing unit 108 can be adapted to produce a static light pattern and/or a dynamic light pattern. The light pattern producing unit 108 comprises at least one of the following elements: a passive diffractive optical element, a passive reflective optical element, a spatial light modulator based on liquid crystals or based a micro-mechanical element. For example, the spatial light modulator can be adapted to modulate the first laser beam 103 over time for generating a dynamic light pattern. The light pattern producing unit can also comprise a micro-mechanical element like the DLP of Texas instruments for producing a light pattern, in particular, an image, by modulating the phase and/or the amplitude of the first laser beam and/or the second laser beam. If the light pattern producing unit, in particular, the micro-mechanical element, works in a reflection mode, the arrangement in FIG. 2 has to be modified such that the first light beam generated by the laser 102 is reflected by the light pattern producing unit 108, wherein the first laser beam reflected by the light pattern producing unit 108 is directed to the holographic reflective element 104 for generating the second laser beam.

The lighting apparatus 101 further comprises a support for holding the different elements of the lighting apparatus 101. Preferentially, the lighting apparatus 101 comprises a casing 111 in which the different elements are arranged and which comprises a window 112 for allowing the second laser beam 105 to leave the casing 111.

Figure 3:
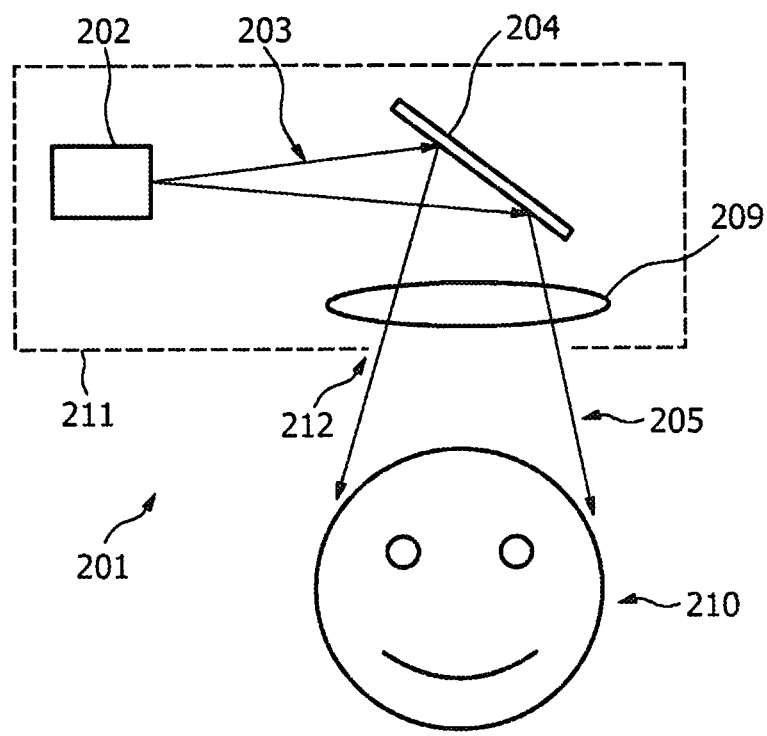
FIG. 3 shows schematically and exemplarily a third embodiment of a lighting apparatus.

FIG. 3 shows schematically and exemplarily a further embodiment of a lighting apparatus 201 comprising a laser 202 for emitting a first laser beam 203 and a holographic reflective element 204. The first laser beam 203 and the holographic reflective element 204 are arranged such that the first laser beam 203 is reflected by the holographic reflective element 204 for generating a second laser beam 205 being the reflected first laser beam. The holographic reflective element 204 is adapted such that the effective surface area of the second laser beam 205 is larger than the effective surface area of the first laser beam 203 and a light pattern 210 is produced by the second laser beam 205. The light pattern 210 is, for example, an image of an object, which is projected onto, for example, a wall by using a projection lens 209. The holographic reflective element 204 is preferentially a thin-phase element that operates by means of interference and diffraction to produce a desired distribution of light. This holographic reflective element can be fabricated with both, binary phase profiles and analog phase profiles. The phase profiles can be produced in a photosensitive material like a photosensitive polymer in the form of a surface relief or a refractive index profile.

Also the second laser beam 205 still has laser characteristics. For example, also the second laser beam 205 can be collimated to a parallel laser beam with high efficiency using an optical element like a lens, and the second laser beam 205 is still coherent. Moreover, also the second laser beam 205 has preferentially an intensity distribution with an angle corresponding to a full width at half maximum of the intensity of the second laser beam 205 being preferentially smaller than 60 degrees.

Also the holographic reflective element 204 is preferentially adapted such that that the second laser beam 205 is focusable by a lens, in particular, by a lens of a healthy eye, to a minimal focus area being larger than the minimal focus area of the first laser beam 203 to which the first laser beam could be focused by using the same lens. In particular, also the holographic reflective element 204 is adapted to increase the effective surface area of the second laser beam 205 such that the second laser beam 205 is eye safe.

The elements of the lighting apparatus 201 are arranged on a support, in particular, within a casing 211 having a window 212 for allowing the second laser beam 205 to leave the casing 211.

Figure 4:
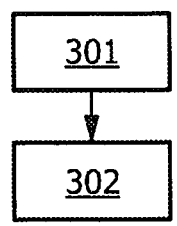
FIG. 4 shows a flowchart exemplarily illustrating an embodiment of a lighting method.

In the following an embodiment of a lighting method will exemplarily be described with reference to a flowchart shown in FIG. 4.

In step 301, a first laser beam is emitted by a laser, and in step 302 the first laser beam is reflected by a diffractive reflective element for generating a second laser beam being the reflected first laser beam, wherein the diffractive reflective element is adapted such that the effective surface area of the second laser beam is larger than the effective surface area of the first laser beam. It should be noted that steps 301 and 302 can be performed simultaneously, i.e. while a first laser beam is emitted, a first laser beam can be reflected by the diffractive reflective element for generating the second laser beam.

Laser eye safety is one of the important points, in particular, when it comes to using lasers in consumer applications. Making such light sources totally eye safe generally means reducing the power output to extremely low values that they are hardly suitable for light applications. The problem with the eye safety of the laser light arises as the light from the laser can be focused by the lens of the human eye to a small spot where the intensity is so high that the eye is damaged. In order to decrease the risk of damaging the eyes of a person, the lighting apparatus uses a diffractive reflective element, in particular, a holographic reflective element, which works in a reflective mode. The diffractive reflective element increases the effective area of the laser beam so that when focused by the human eye a larger spot is obtained on the retina of the eye leading to a lower intensity of the laser spot. In this way the laser light becomes harmless, because the lighting apparatus is preferentially adapted such that this intensity is lower than a damage threshold of the human eye. While decreasing the risk of damaging the retina, in particular, while making the lighting apparatus eye safe, by using the diffractive reflective element, the unique properties of the second laser beam such as coherence, high intensity and collimation are preserved. Moreover, in known lighting apparatuses, which use transmissive components, there is a chance that the transmissive components are damaged and laser light can exit the system and accidentally be directed to the eyes of a person without being modified. The lighting apparatus in accordance with the invention uses a diffractive reflective element preferentially such that in case of a damage and/or displacement of the diffractive reflective element laser light cannot directly continue its path and leave the lighting apparatus, thereby giving the lighting apparatus extra security. In particular, the lighting apparatus is preferentially adapted such that, by using a diffractive reflective element as opposed to a transmissive element extra security is obtained, because if the diffractive reflective element is destroyed or accidently displaced or accidently removed, direct laser light, i.e. the first laser beam, cannot leave the lighting apparatus.

Besides the certain elements of the embodiments of the lighting apparatus described above, the embodiments can have further elements. For example, the embodiments can have a switch for switching the lighting apparatus on and off. Moreover, several different light pattern producing units can be provided, which are exchangeable, for generating different light patterns. Furthermore, elements used in one embodiment can also be used in another embodiment. For example, an embodiment of the lighting apparatus can comprise the holographic reflective element 204, which is adapted such that a light pattern is produced by the second laser beam, and additionally the light pattern producing unit 108.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention relates to a lighting apparatus comprising a laser for emitting a first laser beam and a diffractive reflective element. The first laser beam is reflected by the diffractive reflective element for generating a second laser beam being the reflected first laser beam, wherein the diffractive reflective element is adapted such that the effective surface area of the second laser beam is larger than the effective surface area of the first laser beam. The second laser beam is supposed to be pointed directly or indirectly to the eyes of a person. Since the diffractive reflective element increases the effective surface area and is used in a reflective mode, i.e. the first laser beam will generally not directly meet the eye of the person, if the diffractive reflective element is damaged or displaced, the risk of eye damages can be reduced.

The invention claimed is:

1. A lighting apparatus comprising a laser for emitting a first laser beam and a diffractive reflective element arranged for reflecting the first laser beam to produce a second laser beam, said diffractive reflective element being adapted to widen the second laser beam to an angle such that an effective surface area of the second laser beam is larger than an effective surface area of the first laser beam, where an angle corresponding to a full width at half a maximum intensity of the second laser beam is smaller than 60 degrees.

2. The lighting apparatus as recited in claim 1 where the diffractive reflective element comprises a holographic reflective element.

3. The lighting apparatus as recited in claim 1 where the diffractive reflective element is adapted to increase the effective surface area of the second laser beam such that the second laser beam is eye safe.

4. The lighting apparatus as recited in claim 1 where the lighting apparatus is adapted to expand the first laser beam before said first laser beam impinges on the diffractive reflective element.

5. The lighting apparatus as recited in claim 1 where the diffractive reflective element is adapted to effect the production of a light pattern by the second laser beam.

6. The lighting apparatus as recited in claim 1 where the lighting apparatus comprises a light pattern producing unit for producing a light pattern, said laser, said diffractive reflective element and said light pattern producing unit being arranged such that at least one of the first laser beam and the second laser beam impinges on said light pattern producing unit.

7. The lighting apparatus as recited in claim 6 where the light pattern producing unit is adapted to produce a dynamic light pattern.

8. The lighting apparatus as recited in claim 6 where the light pattern producing unit comprises at least one of:

a passive diffractive optical element, a passive reflective optical element,
a liquid crystal based spatial light modulator,
a micro-mechanical element.

* * * * *